US012418950B2

(12) United States Patent
Lea et al.

(10) Patent No.: US 12,418,950 B2
(45) Date of Patent: *Sep. 16, 2025

(54) MIXED STANDARD ACCESSORY DEVICE COMMUNICATION UTILIZING HOST-COORDINATED TRANSMISSION

(71) Applicant: Microsoft Technology Licensing, LLC, Redmond, WA (US)

(72) Inventors: Perry Victor Lea, Eagle, ID (US); Krishna Kant Chintalapudi, Redmond, WA (US); Steven William Ranta, Seattle, WA (US); Gopala Srihari Narlanka, Bellevue, WA (US); Stanley William Adermann, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,870

(22) Filed: Mar. 29, 2024

(65) Prior Publication Data

US 2024/0244693 A1    Jul. 18, 2024

Related U.S. Application Data

(63) Continuation of application No. 17/502,957, filed on Oct. 15, 2021, now Pat. No. 11,968,732.

(51) Int. Cl.
*H04W 76/15* (2018.01)
*A63F 13/327* (2014.01)
(Continued)

(52) U.S. Cl.
CPC .......... *H04W 76/15* (2018.02); *A63F 13/327* (2014.09); *H04L 5/0053* (2013.01); *H04W 72/12* (2013.01); *A63F 2300/405* (2013.01)

(58) Field of Classification Search
CPC ............... H04W 72/12; H04W 76/14
(Continued)

(56) References Cited

U.S. PATENT DOCUMENTS

2007/0080933 A1   4/2007  Chen et al.
2017/0142201 A1   5/2017  Holmes
(Continued)

OTHER PUBLICATIONS

"Non-Final Office Action Issued in U.S. Appl. No. 17/480,817", mailed on Oct. 16, 2023, 13 pages.
(Continued)

*Primary Examiner* — Angel T Brockman
(74) *Attorney, Agent, or Firm* — Rainier Patents, P.S.

(57) ABSTRACT

A method of managing a wireless communication between a plurality of accessory devices and a host device includes, at the host device, establishing a data connection with a plurality of accessory devices, obtaining a radio ID for each accessory device of the plurality of accessory devices, grouping the plurality of accessory devices into at least one OFDMA device and at least one non-OFDMA device based at least partially on the radio IDs, sending a trigger signal to the at least one OFDMA device; and after receiving a first response signal from the at least one OFDMA device in response to the trigger signal, receiving a second response signal from the at least one non-OFDMA device.

20 Claims, 7 Drawing Sheets

(51) Int. Cl.
*H04L 5/00* (2006.01)
*H04W 72/12* (2023.01)

(58) Field of Classification Search
USPC .......................................................... 370/329
See application file for complete search history.

(56) References Cited

U.S. PATENT DOCUMENTS

| | | |
|---|---|---|
| 2017/0325102 A1 | 11/2017 | Casebolt et al. |
| 2021/0236917 A1 | 8/2021 | Palmer et al. |
| 2023/0123467 A1* | 4/2023 | Lea ....................... H04W 72/51 370/328 |
| 2024/0357684 A1 | 10/2024 | Lea |

OTHER PUBLICATIONS

Notice of Allowance mailed on Mar. 28, 2024, in U.S. Appl. No. 17/480,817, 10 pages.
Notice of Allowance mailed Feb. 2, 2024, in U.S. Appl. No. 17/479,854, 9 pages.
Notice of Allowance mailed Dec. 27, 2023, in U.S. Appl. No. 17/502,957, 7 pages.
Notice of Allowance mailed on Mar. 4, 2025, in U.S. Appl. No. 18/651,932, 24 pages.

\* cited by examiner

MIXED STANDARD ACCESSORY DEVICE COMMUNICATION UTILIZING HOST-COORDINATED TRANSMISSION

CROSS REFERENCE TO RELATED APPLICATIONS

This application is a continuation of U.S. patent application Ser. No. 17/502,957, filed Oct. 15, 2021, which is hereby incorporated by reference in its entirety.

BACKGROUND

Background and Relevant Art

Accessory devices communicate with a host device to send and receive information from a host application. Multiple accessory devices can allow multiple users to interact with the host device at the same time. When multiple accessory devices communicate with the host device, delays and interference can occur.

BRIEF SUMMARY

In some embodiments, a method of managing a wireless communication between a plurality of accessory devices and a host device includes, at the host device, establishing a data connection with a plurality of accessory devices, obtaining a radio ID for each accessory device of the plurality of accessory devices, grouping the plurality of accessory devices into at least one OFDMA device and at least one non-OFDMA device based at least partially on the radio IDs, sending a trigger signal to the at least one OFDMA device; and after receiving a first response signal from the at least one OFDMA device in response to the trigger signal, receiving a second response signal from the at least one non-OFDMA device.

In some embodiments, a host device for providing wireless communication includes a processor, an accessory radio in data communication with the processor, and a hardware storage device in data communication with the processor. The hardware storage device has instructions stored thereon. The instructions, when executed by the processor, cause the host device to obtain a radio ID for each accessory device of a plurality of accessory devices, grouping the plurality of accessory devices into at least one OFDMA device and at least one non-OFDMA device based at least partially on the radio IDs, and set a timing schedule for communication with the at least one OFDMA device and at least one non-OFDMA device.

In some embodiments, a system for providing wireless data communication includes a plurality of accessory devices and a host device. The plurality of accessory devices includes at least one OFDMA accessory device and at least one non-OFDMA accessory device. The host device includes a processor, an accessory radio in data communication with the processor, and a hardware storage device in data communication with the processor. The hardware storage device has instructions stored thereon. The instructions, when executed by the processor, cause the host device to obtain a radio ID for each accessory device of a plurality of accessory devices, grouping the plurality of accessory devices into at least one OFDMA device and at least one non-OFDMA device based at least partially on the radio IDs, and set a timing schedule for communication with the at least one OFDMA device and at least one non-OFDMA device.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 6-1 through FIG. 6-3 illustrate different communication timings, according to at least some embodiments of the present disclosure;

FIG. 7-1 and FIG. 7-2 illustrate timing schedules, according to at least some embodiments of the present disclosure;

DETAILED DESCRIPTION

The present disclosure generally relates to systems and methods for communicating data between a plurality of accessory devices and a host device. The accessory device is an electronic device that communicates data with the host devices through a wireless communication. A variety of accessory devices including different radios and capabilities may be in data communication with the host device at a single time.

A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

Figure 1:
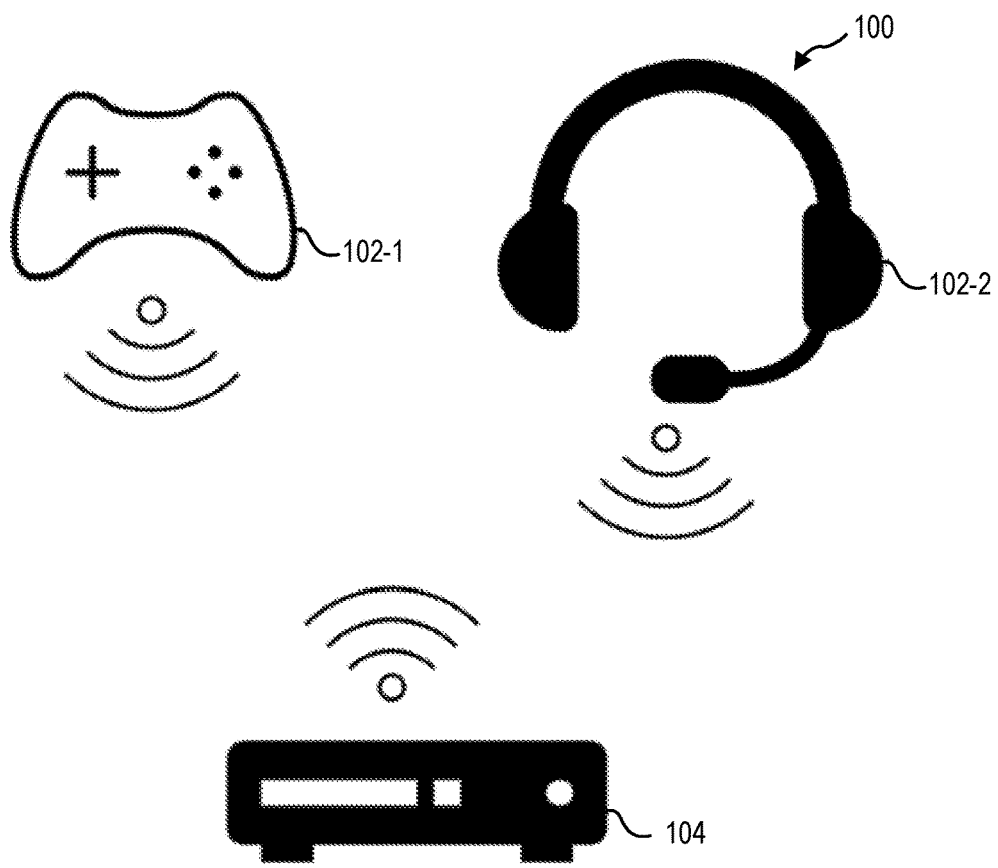
FIG. 1 is a schematic representation of a wireless communication system, according to at least some embodiments of the present disclosure.

FIG. 1 illustrates an example system 100 of accessory devices 102-1, 102-2 communicating with a host device 104. A plurality of accessory devices, such as game controllers, speakers, headsets, keyboards, joysticks, and other human interface devices (HID) pair to a host device and share a bandwidth for communication with the host device through time multiplexing.

In some embodiments, an accessory device 202 includes a processor 206 in communication with a hardware storage device 208. The hardware storage device 208 can be any non-transient computer readable medium that may store instructions thereon. The hardware storage device 208 may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 208 includes instruction stored thereon that, when executed by the processor 206, cause the accessory device 202 to perform any method or part of a method described herein. The hardware storage device 208 or another hardware storage device has, stored thereon, at least one data channel personality.

The accessory device 202 further includes a wireless communication device 210, such as a 802.11 ax radio frequency (RF) transceiver, that allows wireless transmission and receipt of data to the host device and/or control device. In some embodiments, the accessory device 202 has a plurality of wireless communication devices 210 that provide communication at different frequencies or power levels to communicate with different host devices and/or control devices.

The data channel provides communication of state data, audio data, and other frequent communications between the accessory device 202 and a host device. In some embodiments, the accessory device 202 also communicates via a control channel with a control application that provides instructions to the accessory device to change data channel personality. In some embodiments, the control channel may broadcast other device information to the control application, such as current or available stored data channel personalities, current battery status of the accessory device 202, RSSI signal strength, or other functions. In some embodiments, the accessory device has at least one input mechanism 212 locally on the accessory device to select, cycle through, or otherwise change the data channel personality. In embodiments with a control channel, the control channel allows for the communication of latency-tolerant data transmission, while the data channel handles latency-critical information. As the data channel handles latency-critical information, additional accessory devices sharing the bandwidth may create delays in transmission due to time multiplexing.

Figure 3:
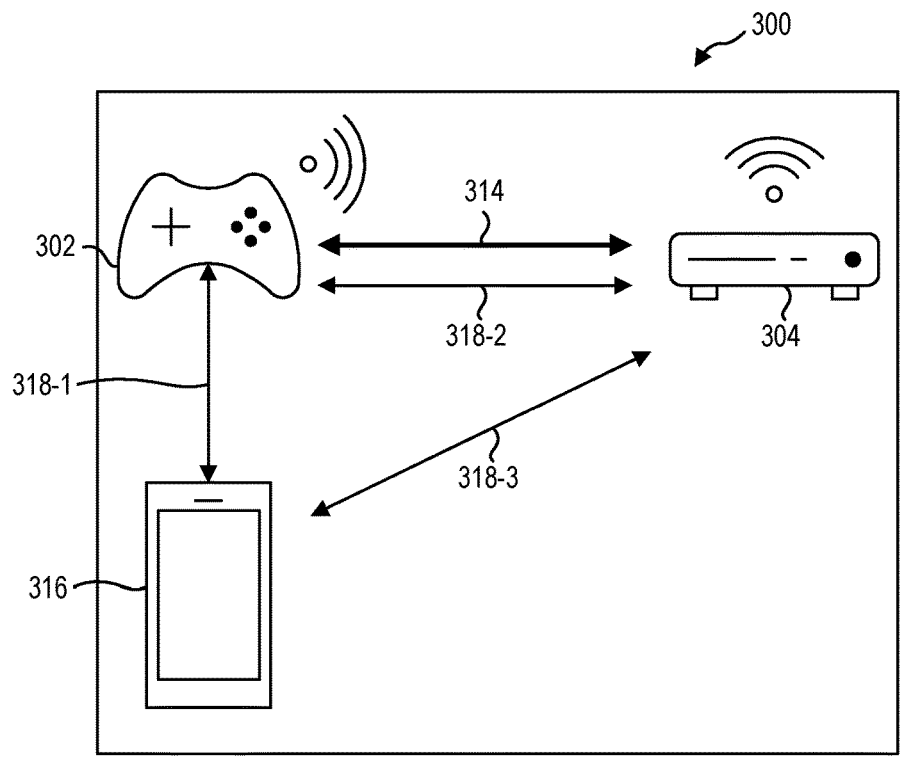
FIG. 3 is a schematic representation of wireless communication channels, according to at least some embodiments of the present disclosure.

Referring now to FIG. 3, in some embodiments, a system 300 includes an accessory device 302 in communication with a host device 304 by a data channel 314 and with a control device 316 via a first control channel 318-1. Other control channels 318-2, 318-3 may further allow device information to be communicated or shared between devices of the system 300 to allow latency-critical information to be sent via the data channel 314 with the least interference and/or delay possible. For example, a second control channel 318-2 between the accessory device 302 and the host device 304 may allow communication of device health and device status information between the accessory device 302 and the host device 304. A third control channel 318-3 between the control device 316 and the host device 304 may allow communication of device health and device status information between the control device 316 and the host device 304.

A data channel 314 includes real-time or substantially real-time communication between the accessory device 302 and the host device 304 to allow a user to interact with a host application executed by the host device 304, such as a game application running on a game console (e.g., MICROSOFT XBOX, SONY PLAYSTATION, NINTENDO SWITCH). The host application may be natively executed on the host device 304. The host application may be a streamed game application executed on a cloud server and accessed through an access point (the host device) to which the accessory device has a data channel. For example, a game controller may transmit controller state data to the host device 304 via the data channel 314 to interact with a game application running on or accessed through the host device 304. In other examples, a headset may receive audio data from the host device 304 via the data channel 314 to represent the sounds in a game environment. In yet other examples, a game controller with a headset connected thereto may transmit chat audio data from the headset through the game controller to the host device 304 via the data channel 314. In some embodiments, the data channel 314 allows for transmission of data between the accessory device 302 and host device 304 at least every 2 milliseconds.

A control channel 318-1, 318-2, 318-3 may allow non-latency-critical information to be transmitted between the accessory device 302 and a control application or device 316. In some embodiments, the control device 316 is different from the host device. For example, a control device 316 may be a user's smartphone that communicates with the accessory device 302 via the control channel 318-1 while the accessory device 302 communicates with a host device 304, such as a game console, via the data channel 314. In some embodiments, the control device 316 is the host device 304, and a control application is different from the host application with which the accessory device 302 communicates via the data channel 314. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

Figure 4:
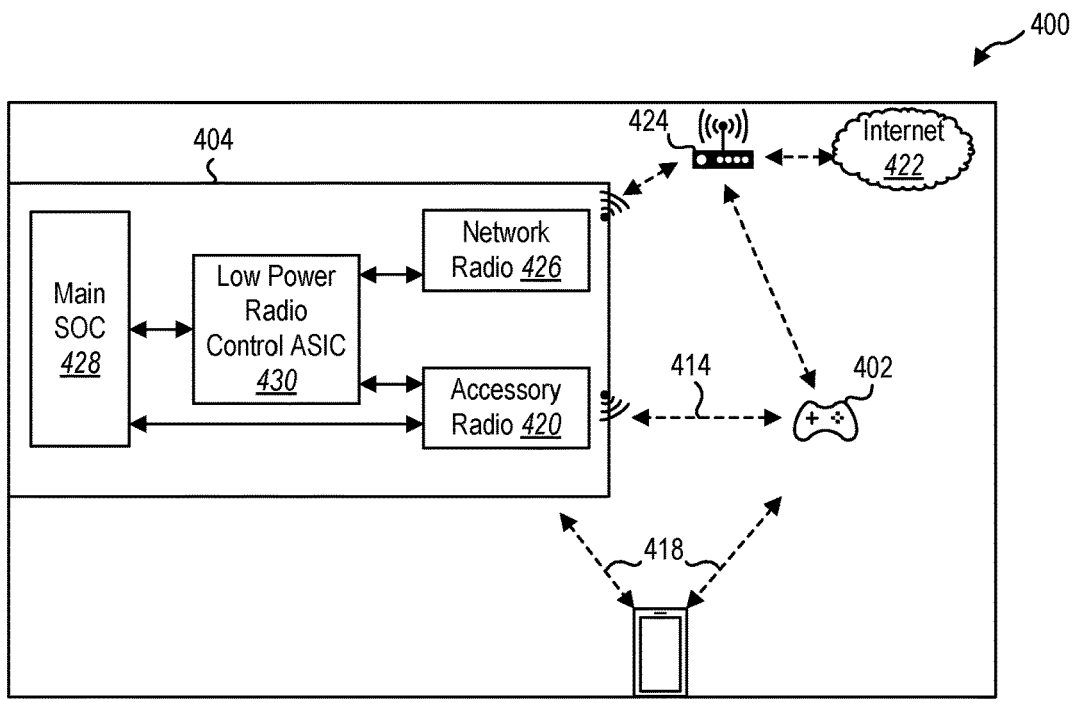
FIG. 4 is a system diagram of a host device and accessory device; according to at least some embodiments of the present disclosure.

Referring now to FIG. 4, an embodiment of a system 400 is illustrated with a host device 404 (e.g., a game console) in communication with an accessory device 402 via an accessory radio 420. The host device 404 is also in data communication with a network 422 through an access point 424 via a network radio 426. A main processor or main SOC 428 of the host device 404 is indirectly connected to the network radio 426 and accessory radio 420 on the through Peripheral Component Interconnect Express (PCIe) or another hardware connection standard.

The Low Power Radio Control ASIC 430 is a device that provides a PCIe pass-through using a non-transparent bridge topology when operating normally. In a low power state (e.g., regulatory-standby), the main SOC 428 will be powered off and network control will be managed by the low power radio control ASIC 430. In this state, the PCIe link will not be used as a pass-through to the main SOC 428, rather the low power radio control ASIC 430 will manage all network connectivity. The low power radio control ASIC 430 may manage wake events and filter network traffic while also ensuring network functionality is maintained. The low power radio control ASIC 430 may use a processor and embedded SRAM or other memory to host enough of the network functionality to respond to certain events and wake the main SOC 428. During a low power mode, the accessory radio 420 may not be managed by the low power radio control ASIC 430. Waking a console in a low power state from the accessory device 402 will rely on the accessory radio 420 responding to a wake signal or beacon from the accessory device 402 and then alerting the main SOC 428 via an in-band or out-of-band signal 432 to wake.

In some embodiments, the host device 402 establishes a data channel 414 between the accessory device 402 (and wireless communication device thereof) and the accessory radio 420 of the host device 404. In some embodiments, a control channel 418 is also established using the accessory radio 420. The data channel 414 carries latency-sensitive information between the accessory device 402 and the host device 404 to provide the user with responsive and immersive interaction with a host application running on (or accessed through) the host device 404. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel 414 can therefor cause inputs to be received after the intended state of the game environment. In a particular example, a 30 ms delay in communicating a user input can cause the user input to arrive at the host device 404 two to three frames after the button is pressed by the user.

In conventional systems using time multiplexing, additional devices using the frequencies of the data channel 414 can cause traffic or congestion on the data channel 414 that slows the transmission of the data. For example, multiple accessory devices sharing the bandwidth for data channels with the accessory radio 420 can cause additional delays. In other examples, devices or radios broadcasting on the same frequency that are not part of the system 400 can cause additional delays in communication.

Figure 5:
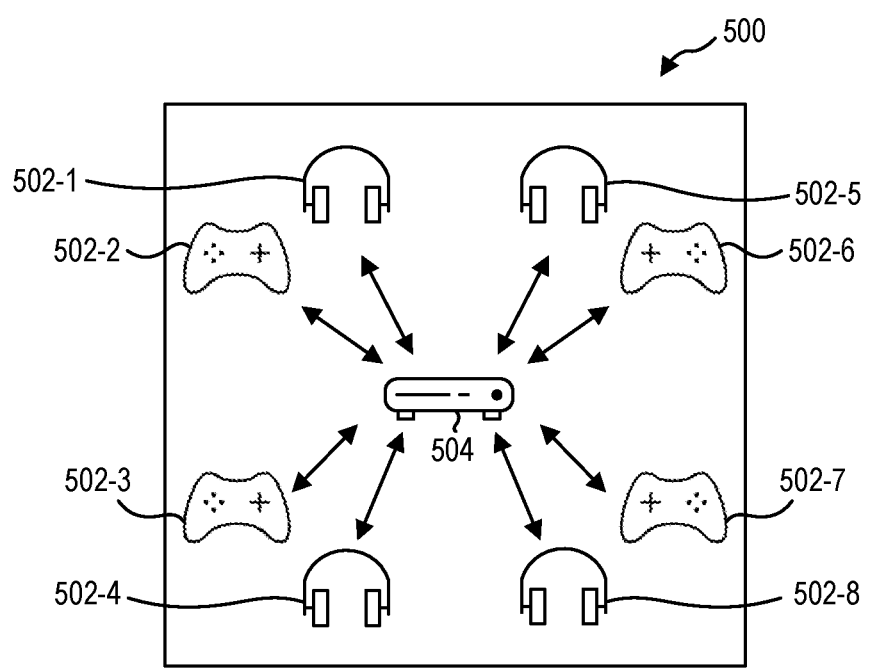
FIG. 5 is a network topology diagram, according to at least some embodiments of the present disclosure.

FIG. 5 illustrates an embodiment of a hub-spoke model for network topology. A hub-spoke model for a system 500 requires the establishment of a different data channel for each accessory device 502-1, 502-2, 502-3, 502-4, 502-5, 502-6, 502-7, 502-8 with the host device 504. In other embodiments, a mesh type network allows an accessory device to act as a node relay to another accessory device (such as a game controller acting as a node relay to a headset). A mesh introduces latency and complications in mesh routing, mesh security, and mesh reliability. A mesh also complicates predictable and sustained bandwidth quality of service. However, a hub-spoke model introduces many individual data channels to communicate with the host device 504. A game console may communicate with up to 8 accessory devices 502-1, 502-2, 502-3, 502-4, 502-5, 502-6, 502-7, 502-8 located in a small area in the example of local or "couch" multiplayer events. In such examples, conventional time-based multiplexing or wait-to-talk communication can introduce delays, which increase with the quantity of accessory devices sharing the frequencies.

Figure 2:
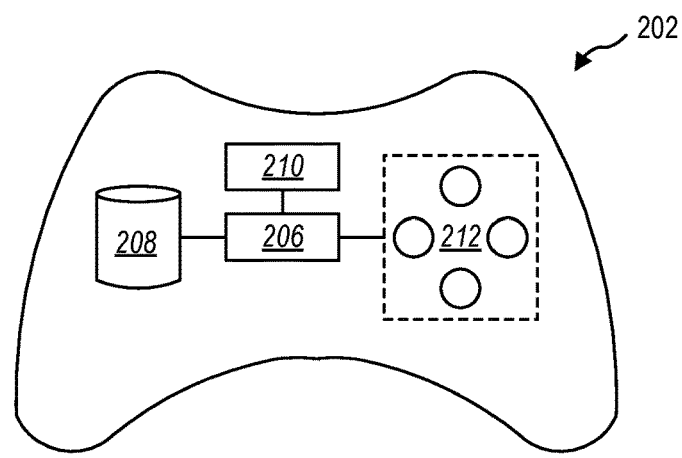
FIG. 2 is a schematic representation of an accessory device, according to at least some embodiments of the present disclosure.
Figures 1, 6:
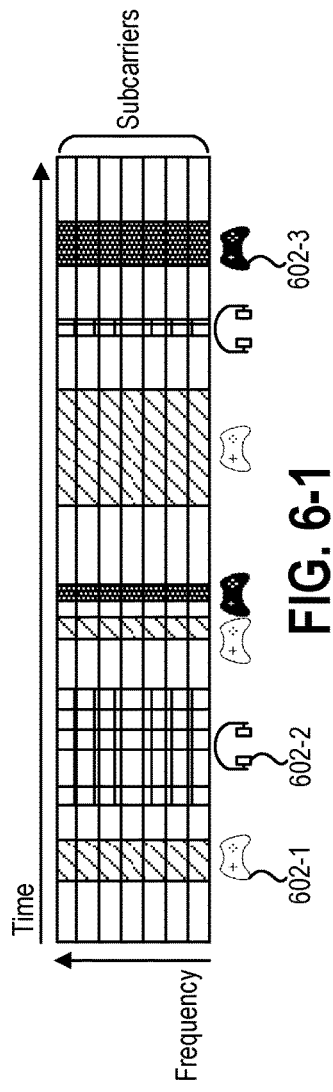
Figures 2, 6:
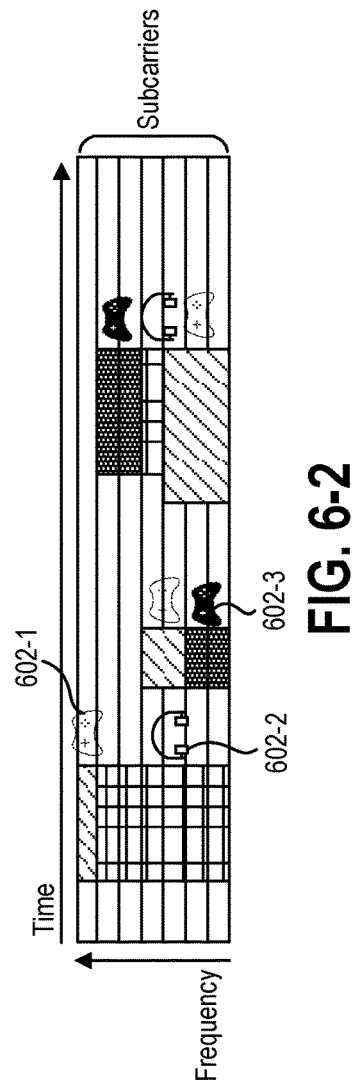
Figures 3, 6:
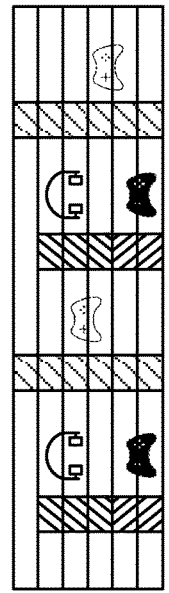

FIG. 6-1 illustrates an example of time-based multiplexing where each of the accessory devices 602-1, 602-2, 602-3 communicates with a host device at a different time from all other accessory devices. Each accessory device, therefor, must wait to transmit on the data channel the latency-sensitive information regarding audio and/or user inputs. Conversely, FIG. 6-2 illustrates an example of the same accessory devices 602-1, 602-2, 602-3 communicating with the host device freely without delay by dividing and assigning the available bandwidth into a plurality of subcarriers or resource units (RUS) that allow each accessory device 602-1, 602-2, 602-3 to transmit on a subcarrier simultaneously with another accessory device. For example, the first accessory device 602-1 can transmit analog state data of the position of an analog stick simultaneously with a second accessory device 602-2 transmitting audio data. The first accessory device 602-1 and third accessory device 602-3 subsequently transmit digital button state data simultaneously. In contrast to a conventional sequential transmission of state data, both players using the first accessory device 602-1 and third accessory device 602-3 transmit data simultaneously. When playing a competitive game, the sequential transmission of data can create a systemic advantage or disadvantage for a particular player.

In some embodiments, equal bandwidth or quantity of subcarriers is allocated to each accessory device. In other embodiments, the amount of bandwidth or quantity of subcarriers can be different between accessory devices based at least partially on the type of accessory device and/or type of data being transmitted. For example, in FIG. 6-2, the first accessory device 602-1 is allocating a single subcarrier to broadcast state data of the game controller buttons while the second accessory device 602-2 is allocated six subcarriers to communicate audio information from a headset. In some embodiments, the allocated subcarrier(s) is fixed for at least one of the accessory devices 602-1, 602-2, 602-3. In some embodiments, the allocated subcarriers are dynamically allocated based on the type of data being communicated. For example, the second accessory device 602-2 is initially allocated six subcarriers to receive game audio from the host device, while the second accessory device 602-2 is later allocated a single subcarrier to broadcast lower quality chat audio from the second accessory device 602-2 to the host device.

Orthogonal Frequency Division Multiple Access (OFDMA) can improve controller latency and overall coexistence issues when enabled. OFDMA allows multiple users or accessory devices to share spectrum efficiently. Whereas legacy Orthogonal Frequency Division Multiplexing (OFDM) techniques used in Wi-Fi 5 and other Wi-Fi standard protocols used time-division multiplexing of frequency space and consumed the entire channel capacity for a single accessory device, OFDMA will localize individual transmissions into different subcarriers or RUs for simultaneous transmission of all data.

To address the systemic advantage or disadvantage for a particular player created by OFDM, some systems timestamp the user input when the user presses a button (or the position of an analog stick or trigger is measured) and all inputs are delayed until all transmissions are received. However, delaying all inputs at the host device to process the inputs together forces a greater perceived input lag by the user because all inputs are further delayed from the frame at which the user input the button press. In other words, the more controllers sending inputs to the game console, the more delayed the inputs feel to the players. To encourage and support local multiplayer and the social environment it creates, game performance and input response time should be as fast as possible while being as fair and simultaneous as possible.

Conventionally, OFDMA allows multiple devices to communicate over a particular bandwidth with less regard for the transmission timing of the other devices. For example, each device could transmit and/or receive data on a designated subcarrier or RU in the bandwidth at any time without contending with other devices. However, instantaneous preparation and transmission of data (e.g., state data, audio data) from the controller adversely affects battery life. Systems and methods according to the present disclosure use OFDMA to force synchronization between the accessory devices by establishing a uniform and simultaneous communication timing at the host device. This can provide users with a more consistent and fairer gameplay experience.

In some embodiments, the host device is responsible for assigning each accessory device a set of subcarriers used. The 802.11n/ac OFDM physical layer specification (PHY) specifies the width of each subcarrier at 312.5 kHz. A 20 MHZ channel is comprised of 64 subcarriers with 52 carrying data, 4 pilots, and 8 guard bands (null). OFMDA reduces the subcarrier width to 78.125 KHz with 256 subcarriers in a 20 MHz channel. Those subcarriers are divided up as: 234 for data, 8 pilots, 3 direct current, and 11 guard bands.

These subcarriers or RUs range from 26 subcarriers (or tones) to 2×996 tones depending on the channel width. In some embodiments, controller hardware limits the design to 20 MHz channels. In some embodiments, controller hardware limits the total channel capacity to 114.7 Mb/s because the hardware may only allow for 256 QAM (not 1024 QAM).

In some embodiments, a controller or other accessory device is based on the 20 MHz channel width. However, other embodiments may handle larger channel width including a 160 MHz width. The RUs are dependent on the number of client accessories or STAs attached.

FIG. 6-3 illustrates an example of a system with a mixture of OFDMA and non-OFDMA devices. In the illustrated example, the first accessory device 602-1 and the second accessory device 602-2 are OFDMA devices (such as devices including an 802.11ax radio), and the third accessory device is a non-OFDMA device. In some examples, the OFDMA devices include a 802.11ax radio and the non-OFDMA devices include 802.11ag radios. The host device may communicate with the OFDMA devices to synchronize the simultaneous communication of data between the host device and the OFDMA devices using one or more methods described herein at a first point in time. The host device may communicate with the non-OFDMA device(s) to coordinate sequential communication of data between the host device and the non-OFDMA device(s) at a second point in time. In some embodiments, the OFDMA devices transmit and/or receive data before the non-OFDMA devices in the timing sequence. In some embodiments, the OFDMA devices transmit and/or receive data after the non-OFDMA device in the timing sequence.

Figures 1, 7:
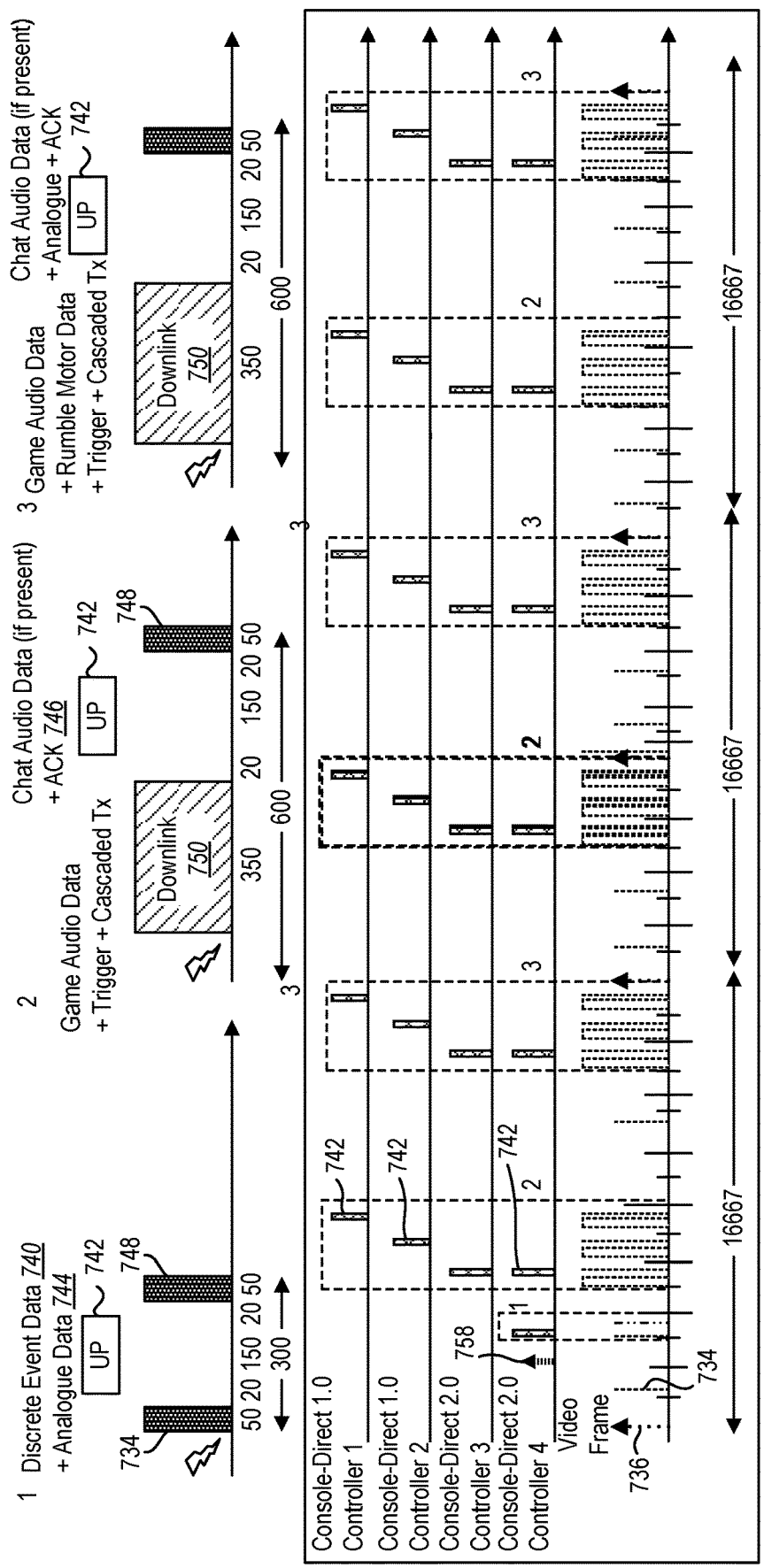
Figures 2, 7:
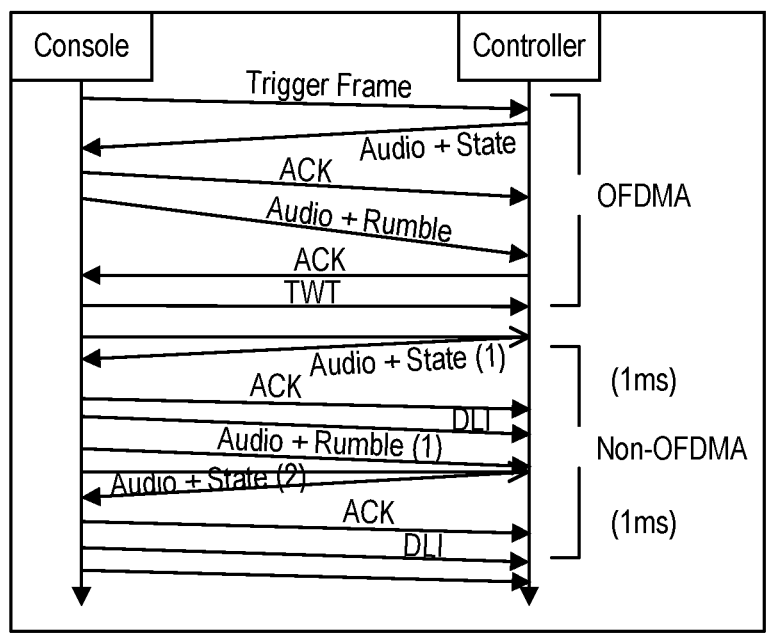

FIG. 7-1 is a timing chart illustrating an embodiment of communication timing for a plurality of accessory devices with a host device. The accessory device transmissions are illustrated inline with the device designation, and the host device transmissions are illustrated in the bottom line for reference to the accessory device transmissions. In some embodiments, the host device serves as the trigger of OFDMA synchronization. For example, the host device may send a trigger signal 734 or trigger frame to the accessory device(s) that triggers and synchronizes the response from the accessory device(s). In some embodiments, the trigger signal is provided every 2 ms.

In some embodiments, the trigger signal 734 provides two benefits. The trigger signal 734 synchronizes response transmissions from the accessory devices such that all accessory devices transmit user inputs and state data simultaneously for fair and immersive gameplay. In some embodiments, the accessory device can at least partially sleep between trigger signals 734, allowing the Wi-Fi-based communication to draw less power, extending wireless battery runtime. For example, at least some of the processing capability or device storage may sleep between trigger signals 734. In the embodiment illustrated in FIG. 7, the frame time is 16.667 ms and trigger signals 734 are transmitted by the host device at approximately 2 ms intervals between video frames 736.

A discrete input event 738 from the user, such as a digital button press, may be received by the input buttons of the accessory device. The discrete event data 740 associated with the discrete input event 738 is cached and transmitted in a response signal 742 including one or more packets in response to the next trigger signal 734 received. In some embodiments, a plurality of discrete input events 738 are received between trigger frames 734 and the discrete event data 740 transmitted in the response signal 742 includes the data from the plurality of discrete input events 738. In some embodiments, the discrete input event 738 is timestamped in the discrete event data 740 to ensure the discrete event data 740 reflects an order of inputs to the accessory device. For example, while the illustrated embodiment in FIG. 7 has a 2 ms interval between trigger frames 734, a longer interval, such as 35 ms, allows time for multiple discrete input events 738. In such examples, the order of discrete input events 738 may alter the meaning of the user inputs for the host device and/or host application, such as motion commands used in the fighting game genre. In other embodiments, the discrete input events 738 may be transmitted in the response signal 742 without timestamps, approximating a simultaneous input of the discrete input events 738 input by the user in the interval of trigger signals 734. For example, a sequence of discrete input events 738 that occur within a 2 ms time period may be reasonably considered to have been intended to be simultaneous inputs by the user. As such, timestamping the discrete input events 738 within each response signal 742 may be unnecessary beyond the timestamp of the response signal 742.

In some embodiments, a response signal 742 includes other state data from the accessory device. For example, the accessory device may transmit one or more packets of state data related to analog data 744 representing the position and/or state of an analog input mechanism (e.g., analog thumbstick, analog trigger, rotary dial) of the accessory device. In some embodiments, the response signal 742 includes chat audio data 746 received by the accessory device to be broadcast to the host device. The host device, after receiving the response signal 742 may transmit an acknowledgement signal 748 confirming receipt.

While discrete input events 738 and analog measurements have been described as being transmitted upon receipt of the next trigger frame 734, other more latency-tolerant communications may occur between the host device and accessory devices at a different interval. For example, a downlink transmission 750 from the host device to the accessory device containing game audio data and/or haptic data (e.g., rumble motor data) may transmit at a greater interval than the trigger signal interval. In the illustrated embodiment in FIG. 7-1, the audio downlink interval is approximately 8 ms, and the haptic downlink interval is approximately the video frame timing. In some embodiments, a downlink interval is greater than the trigger signal interval. In some embodiments, a downlink interval is a multiple of the trigger signal interval. The downlink may include the trigger signal. The downlink transmission may end at the trigger signal interval, maintaining the communication timing.

However, some devices in the timing chart are non-OFDMA devices, such as Controller 1 and Controller 2. In such a case, the host device sends a separate downlink signal 750 to each of the non-OFDMA devices, individually. As shown in Event 2 on the timing chart of FIG. 7-1, the communication with the OFDMA devices occurs simultaneously, while a second downlink signal 750 is sent to the first non-OFDMA device (Controller 2) and, after receiving the response signal 742 from the first non-OFDMA device, a third downlink signal 750 is sent to the second non-OFDMA device (Controller 1).

In some embodiments, the downlink signals sent to the non-OFDMA devices are sent in response to receiving the response signals from the OFDMA devices. For example, the downlink signals sent to the non-OFDMA devices may be sent 1 ms after receiving a response signal or after receiving an acknowledgement from the OFDMA accessory devices. In some embodiments, the downlink signals sent to the non-OFDMA devices are sent after a pre-determined delay after the downlink signals are sent to the OFDMA devices. For example, the downlink signals sent to the non-OFDMA devices may be sent 2 ms after the downlink signal is sent to the OFDMA devices. In some embodiments, the downlink signals sent to the non-OFDMA devices are sent on a pre-determined schedule, independent of the downlink signals sent to the OFDMA devices. For example, the trigger signal 734 may be sent to the OFDMA devices at the trigger signal interval, while the downlink signals sent to the non-OFDMA devices are sent every 8 ms, irrespective of communications with the OFDMA devices. By spacing the downlink signals, the non-OFDMA devices may use the full carrier width (and not subcarriers) without interference from the OFDMA devices. Similarly, the OFDMA devices may use all available subcarriers for efficient and simultaneous communication when the host device ensures the non-OFDMA devices are not communicating.

More specifically, each event described is illustrated in FIG. 7-1. Event 1 is a digital button input. In some examples, a trigger or digital input button generates an event on the controller that causes it to wake and prepare one or more packets for transmission. In this case, data will be aggregated for transmission such as multiple buttons that have been debounced and registered. In the first Event 1 illustrated in FIG. 7-1, OFDMA subchannel communication may not be used, as a single controller generates the event. In other embodiments, OFDMA subchannel communication can be used for upstream data with multiple controllers as shown in the second Event 1 later in the diagram.

Event 2 is an Audio input and output with controller state data. In this example, game audio data sent downstream to the controller is explicit and previously scheduled based on an 8 ms audio downlink interval. The host device will send a trigger signal and subsequently deliver four channels of game audio data to each accessory device. The downlink transmission may use OFDMA subchannel communication, and data is sent in parallel to OFDMA devices. The trigger frame is combined and aggregated with the game audio data to preserve additional bandwidth. Chat audio data from the headsets will be sent immediately after the downstream data is delivered with any discrete event data prepared in the previous trigger signal interval. As shown in FIGS. 7-1 and 7-2, the downlink signal may be sent to each accessory device or group of accessory devices sequentially.

Event 3 includes haptic data and game audio data sent to controllers. In this example, haptic data is sent every 33.334 ms. This implies that game audio data sent downstream to the accessory device is sent one half the downlink interval as haptic data. The haptic data will be aggregated with audio data and sent during that 33.334 ms period.

FIG. 7-2 is a timing chart of the communications between the host device and the accessory devices of FIG. 7-1 in Event 2. The host device coordinates simultaneous communication with the OFDMA devices using the trigger frame 734 (which may be part of a downlink signal) described in relation to FIG. 7-1. The OFDMA devices, simultaneously, send audio and/or state data in the response signal 742, and the host device sends the acknowledgement 748 back. In some embodiments, the host device further sends audio and/or haptic data after the acknowledgement 748. After the host device receives the acknowledgement from the OFDMA devices, the host device then proceeds with communication to the non-OFDMA devices.

In some embodiments, the host device sends a downlink signal 750 to the first non-OFDMA device and the first non-OFDMA device returns a response signal with the audio and/or state data of the device. In some embodiments, the host device does not send a downlink signal, and, instead, the non-OFDMA accessory device sends the audio and/or state data on a predetermined schedule. In some embodiments, the host device sends a DLI instruction to the non-OFDMA accessory device to alter that schedule based on the frame rate of the game rendering, as will be described in relation to FIG. 9.

Figure 8:
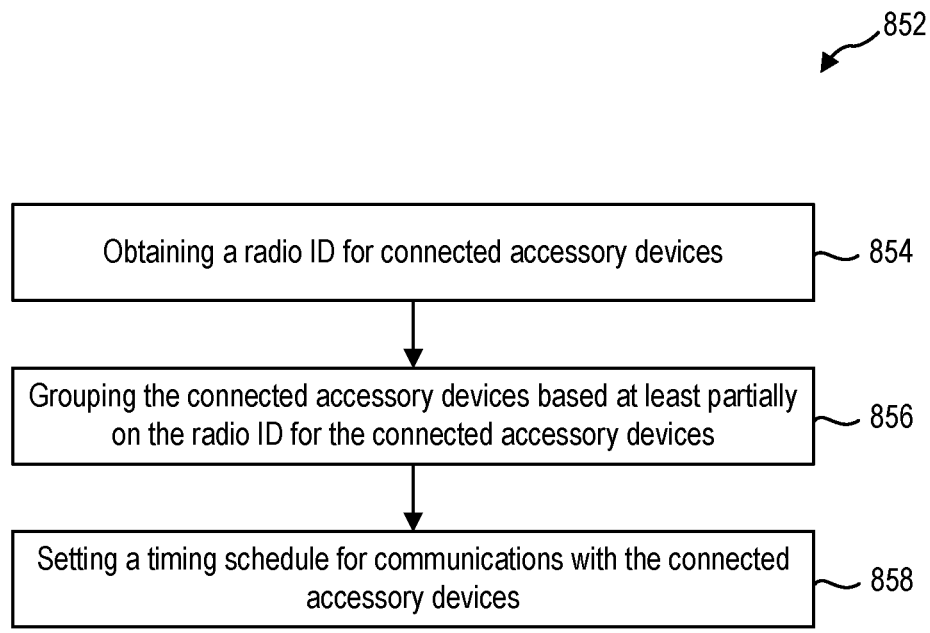
FIG. 8 is a flowchart illustrating a method of managing wireless communications, according to at least some embodiments of the present disclosure.

FIG. 8 is a flowchart illustrating an embodiment of a method 852 of managing communications between a host device and a plurality of accessory devices includes the host device obtaining a radio ID for the accessory devices at 854. For example, upon establishing a data connection to between the host device and the accessory device, the accessory device may send a device ID including information about the accessory device, such as a radio ID. In some embodiments, the host device receives the radio ID from each of the accessory devices in response to the host device sending radio ID requests to the plurality of accessory devices. For example, the host device may send a specific request to the accessory devices to communicate the radio ID to the host device. In some embodiments, the host device may access a lookup table or other database to obtain the radio ID based on the device ID. For example, the accessory device may communicate a device ID to the host device, which the host device may use to determine the radio used in the accessory device. In some embodiments, the radio ID identifies a model of the radio ID. In some embodiments, the radio ID includes one or more properties or capabilities of the radio. In at least one example, the radio ID indicates to the host device the OFDMA capabilities of the radio and/or accessory device.

In some embodiments, the host device groups the accessory devices for communications based at least partially on the radio IDs. More specifically, the host device may group the accessory devices based at least partially on the OFDMA capabilities of the accessory devices indicated by the radio ID and/or device ID at 856. Based at least partially on the radio IDs and/or OFDMA capabilities of the accessory devices, the host device sets a timing schedule for communications with the accessory devices at 858.

In some embodiments, the host device communicates with the OFDMA device(s) simultaneously and communicates with the non-OFDMA device(s) in sequence, such as by time division multiplexing, before or after the OFDMA device(s), such as described herein in relation to FIG. 7-1 and FIG. 7-2.

Figure 9:
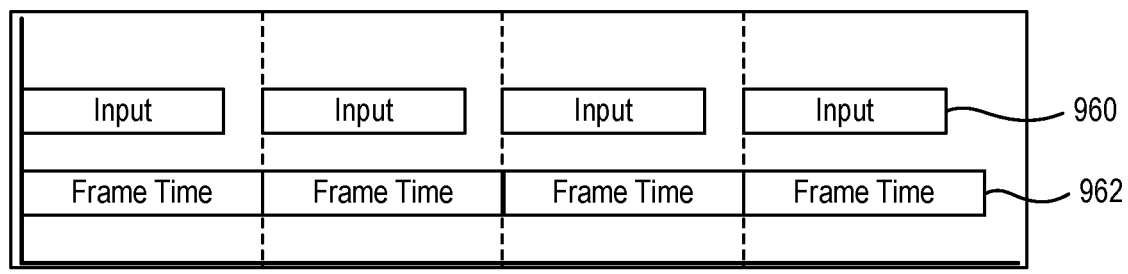
FIG. 9 is an example DLI timing, according to at least some embodiments of the present disclosure.

In some embodiments, the accessory device communication timing is dynamic based on the video frame timing. DLI is a method to support dynamic latency adjustments to align controller transmission to video frames. Rather than send all data as soon as it is available from a controller (such as a discrete input event), transmission data is sent only on negotiated intervals determined between the accessory device and host device. Sending data immediately could effectively reduce battery life by 75% to 80%. An example DLI timing is illustrated in FIG. 9.

DLI allows the user input 960 to be aligned with the rendering of the video frame in the frame time 962. DLI includes timestamping the input when the discrete event data is received to send only as much input as necessary. As the user can only react or respond to the information in a single frame at a time, and the host device can only render the game environment one frame at a time, in some embodiments, sending multiple user inputs 960 to the host device within a single frame time 962 is superfluous.

To accomplish this, DLI allows the host device to fine-tune arrival events from an accessory device based on video frame timing. The accessory devices also timestamp all discrete input events based on the accessory device clock. When the host device sees input from the accessory device, the host device can determine what the accessory device's internal clock value is relative to the video frame. The host device can then request that the accessory device target a specific frame timing and adjust its next report timing forward or backward as needed. The host can also evaluate the transmit timestamps to determine whether the input arrived late because it was sent late or because of some other interference and make allowances.

In some embodiments, the communication timing can be adjusted proactively based on frame timing by collecting data regarding frame timing in certain conditions or portions of a game application. For example, some portions of a game may be expected to render at a known frame time (such as 30 FPS for cutscenes and 60 FPS for interactive gameplay) or during known or measured slowdown during memory transitions. For example, some game applications may experience a reduction in FPS and an associated increase in frame time when the player moves from one contiguous portion of the game environment to another. The changing of cached information in the system memory can create a predictable event where the host device can proactively alter the communication timing. In some embodiments, the host device can use or be in communication with another computing device that uses a machine learning model to learn from known variations in frame time to predict when a frame time change will occur.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

INDUSTRIAL APPLICABILITY

The present disclosure generally relates to systems and methods for communicating data between a plurality of accessory devices and a host device. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

In some embodiments, a plurality of accessory devices communicates with a host device. Conventionally, the plurality of accessory devices, such as game controllers, speakers, headsets, keyboards, joysticks, and other human interface devices (HID) pair to a host device and share a bandwidth for communication with the host device through time multiplexing.

In some embodiments, an accessory device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the accessory device to perform any method or part of a method described herein. The hardware storage device or another hardware storage device has, stored thereon, at least one data channel personality.

The accessory device further includes a wireless communication device, such as a 802.11 ax radio frequency (RF) transceiver, that allows wireless transmission and receipt of data to the host device and/or control device. In some embodiments, the accessory device has a plurality of wireless communication devices that provide communication at different frequencies or power levels to communicate with different host devices and/or control devices.

The data channel provides communication of state data, audio data, and other frequent communications between the accessory device and a host device. In some embodiments, the accessory device also communicates via a control channel with a control application that provides instructions to the accessory device to change data channel personality. In some embodiments, the control channel may broadcast other device information to the control application, such as current or available stored data channel personalities, current battery status of the accessory device, RSSI signal strength, or other functions. In some embodiments, the accessory device has at least one input mechanism locally on the accessory device to select, cycle through, or otherwise change the data channel personality. In embodiments with a control channel, the control channel allows for the communication of latency-tolerant data transmission, while the data channel handles latency-critical information. As the data channel handles latency-critical information, additional accessory devices sharing the bandwidth may create delays in transmission due to time multiplexing.

In some embodiments, a system includes an accessory device in communication with a host device by a data channel and with a control device via a first control channel. Other control channels may further allow device information to be communicated or shared between devices of the system to allow latency-critical information to be sent via the data channel with the least interference and/or delay possible. For example, a second control channel between the accessory device and the host device may allow communication of device health and device status information between the accessory device and the host device. A third control channel between the control device and the host device may allow communication of device health and device status information between the control device and the host device.

A data channel includes real-time or substantially real-time communication between the accessory device and the host device to allow a user to interact with a host application executed by the host device, such as a game application running on a game console (e.g., MICROSOFT XBOX, SONY PLAYSTATION, NINTENDO SWITCH). The host application may be natively executed on the host device 304. The host application may be a streamed game application executed on a cloud server and accessed through an access point (the host device) to which the accessory device has a data channel. For example, a game controller may transmit controller state data to the host device via the data channel to interact with a game application running on or accessed through the host device. In other examples, a headset may receive audio data from the host device via the data channel to represent the sounds in a game environment. In yet other examples, a game controller with a headset connected thereto may transmit chat audio data from the headset through the game controller to the host device via the data channel. In some embodiments, the data channel allows for transmission of data between the accessory device and host device at least every 2 milliseconds.

A control channel may allow non-latency-critical information to be transmitted between the accessory device and a control application or device. In some embodiments, the control device is different from the host device. For example, a control device may be a user's smartphone that communicates with the accessory device via the control channel while the accessory device communicates with a host device, such as a game console, via the data channel. In some embodiments, the control device is the host device, and a control application is different from the host application with which the accessory device communicates via the data channel. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

In some embodiments, a system includes a host device (e.g., a game console) in communication with an accessory device via an accessory radio. The host device is also in data communication with a network through an access point via a network radio. A main processor or main SOC of the host device is indirectly connected to the network radio and accessory radio on the through Peripheral Component Interconnect Express (PCIe) or another hardware connection standard.

The host device has a hardware storage device. In some embodiments, the hardware storage device is part of the main SOC. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the host device to perform any method or part of a method described herein.

The Low Power Radio Control ASIC is a device that provides a PCIe pass-through using a non-transparent bridge topology when operating normally. In a low power state (e.g., regulatory-standby), the main SOC will be powered off and network control will be managed by the low power radio control ASIC. In this state, the PCIe link will not be used as a pass-through to the main SOC, rather the low power radio control ASIC will manage all network connectivity. The low power radio control ASIC may manage wake events and filter network traffic while also ensuring network functionality is maintained. The low power radio control ASIC may use a processor and embedded SRAM or other memory to host enough of the network functionality to respond to certain events and wake the main SOC. During a low power mode, the accessory radio may not be managed by the low power radio control ASIC. Waking a console in a low power state from the accessory device will rely on the accessory radio responding to a wake signal or beacon from the accessory device and then alerting the main SOC via an in-band or out-of-band signal to wake.

In some embodiments, the host device establishes a data channel between the accessory device (and wireless communication device thereof) and the accessory radio of the host device. In some embodiments, a control channel is also established using the accessory radio. The data channel carries latency-sensitive information between the accessory device and the host device to provide the user with responsive and immersive interaction with a host application running on (or accessed through) the host device. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel can therefor cause inputs to be received after the intended state of the game environment. In a particular example, a 30 ms delay in communicating a user input can cause the user input to arrive at the host device two to three frames after the button is pressed by the user.

In conventional systems using time multiplexing, additional devices using the frequencies of the data channel can cause traffic or congestion on the data channel that slows the transmission of the data. For example, multiple accessory devices sharing the bandwidth for data channels with the accessory radio can cause additional delays. In other examples, devices or radios broadcasting on the same frequency that are not part of the system can cause additional delays in communication.

A hub-spoke model for a system requires the establishment of a different data channel for each accessory device with the host device. In other embodiments, a mesh type network allows an accessory device to act as a node relay to another accessory device (such as a game controller acting as a node relay to a headset). A mesh introduces latency and complications in mesh routing, mesh security, and mesh reliability. A mesh also complicates predictable and sustained bandwidth quality of service. However, a hub-spoke model introduces many individual data channels to communicate with the host device. A game console may communicate with up to 8 accessory devices located in a small area in the example of local or "couch" multiplayer events. In such examples, conventional time-based multiplexing or wait-to-talk communication can introduce delays, which increase with the quantity of accessory devices sharing the frequencies.

Time-based multiplexing allows each of the accessory devices to communicate with a host device at a different time from all other accessory devices. Each accessory device, therefor, must wait to transmit on the data channel the latency-sensitive information regarding audio and/or user inputs. In other examples, the same accessory devices may communicate with the host device freely without delay by dividing and assigning the available bandwidth into a plurality of subcarriers or resource units (RUS) that allow each accessory device to transmit on a subcarrier simultaneously with another accessory device. For example, the first accessory device can transmit analog state data of the position of an analog stick simultaneously with a second accessory device transmitting audio data. The first accessory device and third accessory device subsequently transmit digital button state data simultaneously. In contrast to a conventional sequential transmission of state data, both players using the first accessory device and third accessory device transmit data simultaneously. When playing a competitive game, the sequential transmission of data can create a systemic advantage or disadvantage for a particular player.

In some embodiments, equal bandwidth or quantity of subcarriers is allocated to each accessory device. In other embodiments, the amount of bandwidth or quantity of subcarriers can be different between accessory devices based at least partially on the type of accessory device and/or type of data being transmitted. For example, the first accessory device may be allocated a single subcarrier to broadcast state data of the game controller buttons while the second accessory device is allocated six subcarriers to communicate audio information from a headset. In some embodiments, the allocated subcarrier(s) is fixed for at least one of the accessory devices. In some embodiments, the allocated subcarriers are dynamically allocated based on the type of data being communicated. For example, the second accessory device is initially allocated six subcarriers to receive game audio from the host device, while the second accessory device is later allocated a single subcarrier to broadcast lower quality chat audio from the second accessory device to the host device.

Orthogonal Frequency Division Multiple Access (OFDMA) can improve controller latency and overall coexistence issues when enabled. OFDMA allows multiple users or accessory devices to share spectrum efficiently. Whereas legacy Orthogonal Frequency Division Multiplexing (OFDM) techniques used in Wi-Fi 5 and other Wi-Fi standard protocols used time-division multiplexing of frequency space and consumed the entire channel capacity for a single accessory device, OFDMA will localize individual transmissions into different subcarriers or RUs for simultaneous transmission of all data.

To address the systemic advantage or disadvantage for a particular player created by OFDM, some systems time-stamp the user input when the user presses a button (or the position of an analog stick or trigger is measured) and all inputs are delayed until all transmissions are received. However, delaying all inputs at the host device to process the inputs together forces a greater perceived input lag by the user because all inputs are further delayed from the frame at which the user input the button press. In other words, the more controllers sending inputs to the game console, the more delayed the inputs feel to the players. To encourage and support local multiplayer and the social environment it creates, game performance and input response time should be as fast as possible while being as fair and simultaneous as possible.

Conventionally, OFDMA allows multiple devices to communicate over a particular bandwidth with less regard for the transmission timing of the other devices. For example, each device could transmit and/or receive data on a designated subcarrier or RU in the bandwidth at any time without contending with other devices. However, instantaneous preparation and transmission of data (e.g., state data, audio data) from the controller adversely affects battery life. Systems and methods according to the present disclosure use OFDMA to force synchronization between the accessory devices by establishing a uniform and simultaneous communication timing at the host device. This can provide users with a more consistent and fairer gameplay experience.

In some embodiments, the host device is responsible for assigning each accessory device a set of subcarriers used. The 802.11n/ac OFDM physical layer specification (PHY) specifies the width of each subcarrier at 312.5 kHz. A 20 MHZ channel is comprised of 64 subcarriers with 52 carrying data, 4 pilots, and 8 guard bands (null). OFMDA reduces the subcarrier width to 78.125 KHz with 256 subcarriers in a 20 MHz channel. Those subcarriers are divided up as: 234 for data, 8 pilots, 3 direct current, and 11 guard bands.

These subcarriers or RUs range from 26 subcarriers (or tones) to 2×996 tones depending on the channel width. In some embodiments, controller hardware limits the design to 20 MHz channels. In some embodiments, controller hardware limits the total channel capacity to 114.7 Mb/s because the hardware may only allow for 256 QAM (not 1024 QAM).

In some embodiments, a controller or other accessory device is based on the 20 MHz channel width. However, other embodiments may handle larger channel width including a 160 MHz width. The RUs are dependent on the number of client accessories or STAs attached.

In some embodiments, a system supports a mixture of OFDMA and non-OFDMA devices in communication with the host device. In an example, a first accessory device and a second accessory device are OFDMA devices (such as devices including an 802.11ax radio), and a third accessory device is a non-OFDMA device. In some examples, the OFDMA devices include a 802.11ax radio and the non-OFDMA devices include 802.11ag radios. The host device may communicate with the OFDMA devices to synchronize the simultaneous communication of data between the host device and the OFDMA devices using one or more methods described herein at a first point in time. The host device may communicate with the non-OFDMA device(s) to coordinate sequential communication of data between the host device and the non-OFDMA device(s) at a second point in time. In some embodiments, the OFDMA devices transmit and/or receive data before the non-OFDMA devices in the timing sequence. In some embodiments, the OFDMA devices transmit and/or receive data after the non-OFDMA device in the timing sequence.

In some embodiments, the host device serves as the trigger of OFDMA synchronization. For example, the host device may send a trigger signal or trigger frame to the accessory device(s) that triggers and synchronizes the response from the accessory device(s). In some embodiments, the trigger signal is provided every 2 ms.

In some embodiments, the trigger signal provides two benefits. The trigger signal synchronizes response transmissions from the accessory devices such that all accessory devices transmit user inputs and state data simultaneously for fair and immersive gameplay. In some embodiments, the accessory device can at least partially sleep between trigger signals, allowing the Wi-Fi-based communication to draw less power, extending wireless battery runtime. For example, at least some of the processing capability or device storage may sleep between trigger signals. In some embodiments, the frame time is 16.667 ms and trigger signals are transmitted by the host device at approximately 2 ms intervals between video frames.

A discrete input event from the user, such as a digital button press, may be received by the input buttons of the accessory device. The discrete event data associated with the discrete input event is cached and transmitted in a response signal including one or more packets in response to the next trigger signal received. In some embodiments, a plurality of discrete input events are received between trigger frames and the discrete event data transmitted in the response signal includes the data from the plurality of discrete input events. In some embodiments, the discrete input event is timestamped in the discrete event data to ensure the discrete event data reflects an order of inputs to the accessory device. For example, while some embodiments have a 2 ms interval between trigger frames, a longer interval, such as 35 ms, allows time for multiple discrete input events. In such examples, the order of discrete input events may alter the meaning of the user inputs for the host device and/or host application, such as motion commands used in the fighting game genre. In other embodiments, the discrete input events may be transmitted in the response signal without timestamps, approximating a simultaneous input of the discrete input events input by the user in the interval of trigger signals. For example, a sequence of discrete input events that occur within a 2 ms time period may be reasonably considered to have been intended to be simultaneous inputs by the user. As such, timestamping the discrete input events within each response signal may be unnecessary beyond the timestamp of the response signal.

In some embodiments, a response signal includes other state data from the accessory device. For example, the accessory device may transmit one or more packets of state data related to analog data representing the position and/or state of an analog input mechanism (e.g., analog thumbstick, analog trigger, rotary dial) of the accessory device. In some embodiments, the response signal includes chat audio data received by the accessory device to be broadcast to the host device. The host device, after receiving the response signal may transmit an acknowledgement signal confirming receipt.

While discrete input events and analog measurements have been described as being transmitted upon receipt of the next trigger frame, other more latency-tolerant communications may occur between the host device and accessory devices at a different interval. For example, a downlink transmission from the host device to the accessory device containing game audio data and/or haptic data (e.g., rumble motor data) may transmit at a greater interval than the trigger signal interval. In some embodiments, the audio downlink interval is approximately 8 ms, and the haptic downlink interval is approximately the video frame timing. In some embodiments, a downlink interval is greater than the trigger signal interval. In some embodiments, a downlink interval is a multiple of the trigger signal interval. The downlink may include the trigger signal. The downlink transmission may end at the trigger signal interval, maintaining the communication timing.

However, some devices in the timing schedule are non-OFDMA devices. In such a case, the host device sends a separate downlink signal to each of the non-OFDMA devices, individually. In some embodiments, the communication with the OFDMA devices occurs simultaneously, while a second downlink signal is sent to the first non-OFDMA device and, after receiving the response signal from the first non-OFDMA device, a third downlink signal is sent to the second non-OFDMA device.

In some embodiments, the downlink signals sent to the non-OFDMA devices are sent in response to receiving the response signals from the OFDMA devices. For example, the downlink signals sent to the non-OFDMA devices may be sent 1 ms after receiving a response signal or after receiving an acknowledgement from the OFDMA accessory devices. In some embodiments, the downlink signals sent to the non-OFDMA devices are sent after a pre-determined delay after the downlink signals are sent to the OFDMA devices. For example, the downlink signals sent to the non-OFDMA devices may be sent 2 ms after the downlink signal is sent to the OFDMA devices. In some embodiments, the downlink signals sent to the non-OFDMA devices are sent on a pre-determined schedule, independent of the downlink signals sent to the OFDMA devices. For example, the trigger signal may be sent to the OFDMA devices at the trigger signal interval, while the downlink signals sent to the non-OFDMA devices are sent every 8 ms, irrespective of communications with the OFDMA devices. By spacing the downlink signals, the non-OFDMA devices may use the full carrier width (and not subcarriers) without interference from the OFDMA devices. Similarly, the OFDMA devices may use all available subcarriers for efficient and simultaneous communication when the host device ensures the non-OFDMA devices are not communicating.

In some embodiments, a method of managing communications between a host device and a plurality of accessory devices includes the host device obtaining a radio ID for the accessory devices. For example, upon establishing a data connection to between the host device and the accessory device, the accessory device may send a device ID including information about the accessory device, such as a radio ID. In some embodiments, the host device receives the radio ID from each of the accessory devices in response to the host device sending radio ID requests to the plurality of accessory devices. For example, the host device may send a specific request to the accessory devices to communicate the radio ID to the host device. In some embodiments, the host device may access a lookup table or other database to obtain the radio ID based on the device ID. For example, the accessory device may communicate a device ID to the host device, which the host device may use to determine the radio used in the accessory device. In some embodiments, the radio ID identifies a model of the radio ID. In some embodiments, the radio ID includes one or more properties or capabilities of the radio. In at least one example, the radio ID indicates to the host device the OFDMA capabilities of the radio and/or accessory device.

In some embodiments, the host device groups the accessory devices for communications based at least partially on the radio IDs. More specifically, the host device may group the accessory devices based at least partially on the OFDMA capabilities of the accessory devices indicated by the radio ID and/or device ID. Based at least partially on the radio IDs and/or OFDMA capabilities of the accessory devices, the host device sets a timing schedule for communications with the accessory devices.

In some embodiments, the host device communicates with the OFDMA device(s) simultaneously and communicates with the non-OFDMA device(s) in sequence, such as by time division multiplexing, before or after the OFDMA device(s).

In some embodiments, the accessory device communication timing is dynamic based on the video frame timing. DLI is a method to support dynamic latency adjustments to align controller transmission to video frames. Rather than send all data as soon as it is available from a controller (such as a discrete input event), transmission data is sent only on negotiated intervals determined between the accessory device and host device. Sending data immediately could effectively reduce battery life by 75% to 80%.

DLI allows the user input to be aligned with the rendering of the video frame in the frame time. DLI includes time-stamping the input when the discrete event data is received to send only as much input as necessary. As the user can only react or respond to the information in a single frame at a time, and the host device can only render the game environment one frame at a time, in some embodiments, sending multiple user inputs to the host device within a single frame time is superfluous.

To accomplish this, DLI allows the host device to fine-tune arrival events from an accessory device based on video frame timing. The accessory devices also timestamp all discrete input events based on the accessory device clock. When the host device sees input from the accessory device, the host device can determine what the accessory device's internal clock value is relative to the video frame. The host device can then request that the accessory device target a specific frame timing and adjust its next report timing forward or backward as needed. The host can also evaluate the transmit timestamps to determine whether the input arrived late because it was sent late or because of some other interference and make allowances.

In some embodiments, the communication timing can be adjusted proactively based on frame timing by collecting data regarding frame timing in certain conditions or portions of a game application. For example, some portions of a game may be expected to render at a known frame time (such as 30 FPS for cutscenes and 60 FPS for interactive gameplay) or during known or measured slowdown during memory transitions. For example, some game applications may experience a reduction in FPS and an associated increase in frame time when the player moves from one contiguous portion of the game environment to another. The changing of cached information in the system memory can create a predictable event where the host device can proactively alter the communication timing. In some embodiments, the host device can use or be in communication with another computing device that uses a machine learning model to learn from known variations in frame time to predict when a frame time change will occur.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

The present disclosure relates to systems and methods for communicating data between a plurality of accessory devices and a host device according to at least the examples provided in the sections below:

[A1] In some embodiments, a method of managing a wireless communication between a plurality of accessory devices and a host device includes, at the host device, establishing a data connection with a plurality of accessory devices, obtaining a radio ID for each accessory device of the plurality of accessory devices, grouping the plurality of accessory devices into at least one OFDMA device and at least one non-OFDMA device based at least partially on the radio IDs, sending a trigger signal to the at least one OFDMA device; and after receiving a first response signal from the at least one OFDMA device in response to the trigger signal, receiving a second response signal from the at least one non-OFDMA device.

[A2] In some embodiments, the method of [A1] includes obtaining the radio ID by receiving the radio ID from each accessory device of the plurality of accessory devices.

[A3] In some embodiments, obtaining the radio ID of [A1] includes receiving a device ID from each accessory device of the plurality of accessory devices.

[A4] In some embodiments, obtaining the radio ID of [A1] includes using a lookup table to obtain the radio ID based on the device ID in the lookup table.

[A5] In some embodiments, receiving the second response signal in any of [A1] through [A4] includes sending a downlink signal to a first non-OFDMA device of the at least one non-OFDMA device after receiving the first response signal.

[A6] In some embodiments, receiving the second response signal in any of [A1] through [A4] includes receiving the second response signal on a predetermined schedule.

[A7] In some embodiments, the method of [A6] includes changing the predetermined schedule based at least partially on a framerate.

[A8] In some embodiments, at least one of the first response signal and the second response signal of any of [A1] through [A7] includes discrete event data from a plurality of discrete input events.

[B1] In some embodiments, a host device for providing wireless communication includes a processor, an accessory radio in data communication with the processor, and a hardware storage device in data communication with the processor. The hardware storage device has instructions stored thereon. The instructions, when executed by the processor, cause the host device to obtain a radio ID for each accessory device of a plurality of accessory devices, grouping the plurality of accessory devices into at least one OFDMA device and at least one non-OFDMA device based at least partially on the radio IDs, and set a timing schedule for communication with the at least one OFDMA device and at least one non-OFDMA device.

[B2] In some embodiments, the timing schedule of [B1] includes receiving a response signal from a plurality of OFDMA devices simultaneously and subsequently receiving a second response signal from a non-OFDMA device.

[B3] In some embodiments, the timing schedule of [B1] includes receiving, in a single event, a response signal from a non-OFDMA device, and subsequently receiving response signals from a plurality of OFDMA devices simultaneously.

[B4] In some embodiments, the timing schedule of [B1] includes sending a trigger signal to the at least one OFDMA device to receive a first response signal and waiting a predetermined delay to send a downlink signal to a first non-OFDMA device of the at least one non-OFDMA device.

[B5] In some embodiments, the timing schedule of [B1] includes sending a trigger signal to the at least one OFDMA device to receive a first response signal and waiting according to a predetermined schedule to receive a second response signal from a first non-OFDMA device of the at least one non-OFDMA device.

[B6] In some embodiments, the timing schedule of [B1] includes communicating with a plurality of OFDMA devices simultaneously and sequentially communicating with a plurality of non-OFDMA devices.

[C1] In some embodiments, a system for providing wireless data communication includes a plurality of accessory devices and a host device. The plurality of accessory devices includes at least one OFDMA accessory device and at least one non-OFDMA accessory device. The host device includes a processor, an accessory radio in data communication with the processor, and a hardware storage device in data communication with the processor. The hardware storage device has instructions stored thereon. The instructions, when executed by the processor, cause the host device to obtain a radio ID for each accessory device of a plurality of accessory devices, grouping the plurality of accessory devices into at least one OFDMA device and at least one non-OFDMA device based at least partially on the radio IDs, and set a timing schedule for communication with the at least one OFDMA device and at least one non-OFDMA device.

[C2] In some embodiments, the plurality of accessory devices includes game controllers, and the host device is a game console.

[C3] In some embodiments, obtaining the radio ID of [C1] or [C2] includes at least one of the accessory devices of the plurality of accessory devices transmitting one or more properties of a wireless communication device of the accessory device.

[C4] In some embodiments, the instructions of any of [C1] through [C3] include transmitting the timing schedule to at least one non-OFDMA device of the plurality of accessory devices, and wherein the at least one non-OFDMA device of the plurality of accessory devices stores the timing schedule thereon.

[C5] In some embodiments, the instructions of any of [C1] through [C4] include changing the timing schedule based on a framerate and transmitting an updated timing schedule to the at least one non-OFDMA device of the plurality of accessory devices.

[C6] In some embodiments, the instructions of any of [C1] through [C5] include transmitting a downlink signal to all of the accessory devices in the OFDMA device group before transmitting a downlink signal to a first non-OFDMA device of the non-OFDMA device group.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of managing wireless communication between a plurality of accessory devices and a host device, the method including:
    at the host device:
        establishing a data connection with the plurality of accessory devices;
        obtaining a radio identification (ID) for each accessory device of the plurality of accessory devices;
        grouping the plurality of accessory devices into at least one OFDMA device and at least one non-OFDMA device based at least partially on the radio IDs; and
        setting a timing schedule for communication with the at least one OFDMA device and the at least one non-OFDMA device based at least partially on a framerate.

2. The method of claim 1, wherein obtaining the radio ID includes receiving the radio ID from each accessory device of the plurality of accessory devices.

3. The method of claim 1, wherein obtaining the radio ID includes receiving a device ID from each accessory device of the plurality of accessory devices.

4. The method of claim 3, wherein obtaining the radio ID includes using a lookup table to obtain the radio ID based on the device ID in the lookup table.

5. The method of claim 1, wherein the timing schedule includes receiving a response signal from a plurality of OFDMA devices simultaneously, and subsequently receiving a second response signal from a non-OFDMA device.

6. The method of claim 1, wherein the timing schedule includes receiving, in a single event, a response signal from a non-OFDMA device, and subsequently receiving response signals from a plurality of OFDMA devices simultaneously.

7. The method of claim 1, wherein the timing schedule includes sending a trigger signal to the at least one OFDMA device to receive a first response signal and waiting a predetermined delay to send a downlink signal to a first non-OFDMA device of the at least one non-OFDMA device.

8. The method of claim 1, wherein the timing schedule includes sending a trigger signal to the at least one OFDMA device to receive a first response signal and waiting according to a predetermined schedule to receive a second response signal from a first non-OFDMA device of the at least one non-OFDMA device.

9. The method of claim 1, wherein the timing schedule includes communicating with a plurality of OFDMA devices simultaneously and sequentially communicating with a plurality of non-OFDMA devices.

10. The method of claim 1, further comprising:
    transmitting the timing schedule to the at least one non-OFDMA device of the plurality of accessory devices,
    wherein the at least one non-OFDMA device of the plurality of accessory devices stores the timing schedule thereon.

11. The method of claim 10, further comprising:
    changing the timing schedule, and
    transmitting an updated timing schedule to the at least one non-OFDMA device of the plurality of accessory devices.

12. The method of claim 1, further comprising transmitting a downlink signal to all of the accessory devices in the OFDMA device group before transmitting a downlink signal to a first non-OFDMA device of the non-OFDMA device group.

13. A host device for providing wireless data communication, the host device comprising:
    a processor;
    an accessory radio in data communication with the processor; and
    a hardware storage device in data communication with the processor, the hardware storage device having instructions stored thereon configured to, when executed by the processor, cause the host device to:
    obtain a radio ID for each accessory device of a plurality of accessory devices,
    group the plurality of accessory devices into at least one OFDMA device and at least one non-OFDMA device based at least partially on the radio IDs,
    send a trigger signal to the at least one OFDMA device; and
    after receiving a first response signal from the at least one OFDMA device in response to the trigger signal, receive a second response signal from the at least one non-OFDMA device, wherein at least one of the first response signal or the second response signal includes discrete event data from a plurality of discrete input events.

14. The host device of claim 13, wherein receiving the second response signal from the at least one non-OFDMA device includes receiving the second response signal on a predetermined timing schedule.

15. The host device of claim 13, wherein both the first response signal and the second response signal include respective discrete event data from respective discrete input events.

16. The host device of claim 13, wherein the instructions receiving the second response signal from the at least one non-OFDMA device includes sending a downlink signal to a first non-OFDMA device of the at least one non-OFDMA device after receiving the first response signal.

17. A system for providing wireless data communication, the system comprising:
- a plurality of accessory devices including:
  - at least one OFDMA accessory device; and
  - at least one non-OFDMA accessory device; and
- a host device including:
  - a processor;
  - an accessory radio in data communication with the processor; and
  - a hardware storage device in data communication with the processor, the hardware storage device having instructions stored thereon that, when executed by the processor, cause the host device to:
    - obtain a radio ID for each accessory device of the plurality of accessory devices,
    - group the plurality of accessory devices into at least one OFDMA device and at least one non-OFDMA device based at least partially on the radio IDs, and
    - set a timing schedule for communication with the at least one OFDMA device and the at least one non-OFDMA device.

18. The system of claim 17, wherein the plurality of accessory devices includes game controllers, and the host device is a game console.

19. The system of claim 18, wherein obtaining the radio ID includes at least one of the accessory devices of the plurality of accessory devices transmitting one or more properties of a wireless communication device of the accessory device.

20. The method of claim 1, wherein the timing schedule specifies that multiple OFDMA devices communicate in parallel and that multiple non-OFDMA devices communicate sequentially, and wherein the multiple OFDMA devices employ different subcarriers when communicating in parallel.

* * * * *